US009160580B2

(12) United States Patent
Cohen et al.

(10) Patent No.: US 9,160,580 B2
(45) Date of Patent: Oct. 13, 2015

(54) ADAPTIVE EQUALIZER UTILIZING EYE DIAGRAM

(71) Applicant: Conexant Systems, Inc., Newport Beach, CA (US)

(72) Inventors: Hanan Cohen, San Diego, CA (US); Sudhaker R. Anumula, San Diego, CA (US)

(73) Assignee: CONEXANT SYSTEMS, INC., Newport Beach, CA (US)

( * ) Notice: Subject to any disclaimer, the term of this patent is extended or adjusted under 35 U.S.C. 154(b) by 107 days.

(21) Appl. No.: 13/774,923

(22) Filed: Feb. 22, 2013

(65) Prior Publication Data

US 2013/0223505 A1     Aug. 29, 2013

Related U.S. Application Data

(60) Provisional application No. 61/603,157, filed on Feb. 24, 2012.

(51) Int. Cl.
*H03H 7/30* (2006.01)
*H04L 25/03* (2006.01)

(52) U.S. Cl.
CPC .............................. *H04L 25/03885* (2013.01)

(58) Field of Classification Search
CPC .. H04L 27/01; H04L 25/0212; H04L 27/2647
USPC .................................................. 375/232, 233
See application file for complete search history.

(56) References Cited

U.S. PATENT DOCUMENTS

| 6,760,676 | B2  |   | 7/2004  | Nygaard, Jr. |
|-----------|-----|---|---------|--------------|
| 6,768,703 | B2  |   | 7/2004  | Nygaard, Jr. et al. |
| 7,796,708 | B2  | * | 9/2010  | Yehudai ........................ 375/324 |
| 8,355,469 | B2  |   | 1/2013  | Baker et al. |
| 2003/0053571 | A1 | * | 3/2003 | Belotserkovsky et al. ... 375/350 |
| 2004/0125874 | A1 |   | 7/2004 | Baumert |
| 2005/0141657 | A1 | * | 6/2005 | Maltsev et al. ............... 375/346 |
| 2006/0088318 | A1 | * | 4/2006 | Bohn et al. ...................... 398/41 |
| 2007/0286301 | A1 | * | 12/2007 | Ohta et al. .................... 375/265 |
| 2011/0317751 | A1 | * | 12/2011 | Roethig et al. ................ 375/232 |
| 2013/0011133 | A1 |   | 1/2013 | Skoog et al. |

* cited by examiner

*Primary Examiner* — Shuwang Liu
*Assistant Examiner* — David S Huang
(74) *Attorney, Agent, or Firm* — Haynes and Boone, LLP

(57) ABSTRACT

A communications system comprising a communications media. A receiver coupled to the communications media and configured to receive a data signal from the communications media. An adaptive equalizer configured to process the data signal and to adjust a multi-frequency inverse transfer function to compensate for a multi-frequency transfer function of the communications media.

18 Claims, 3 Drawing Sheets

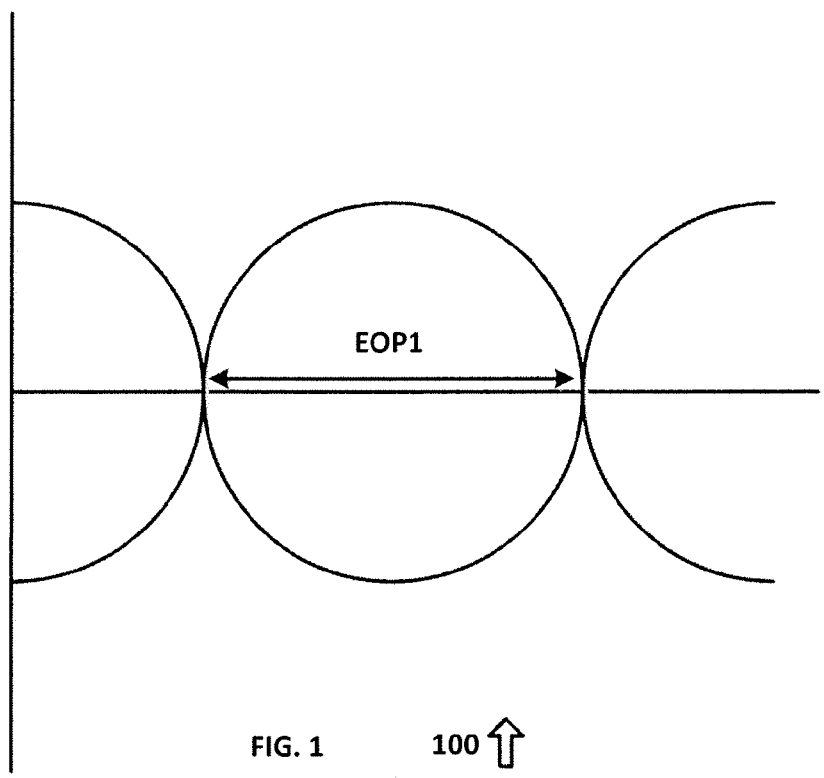
FIG. 1    100 ⇧
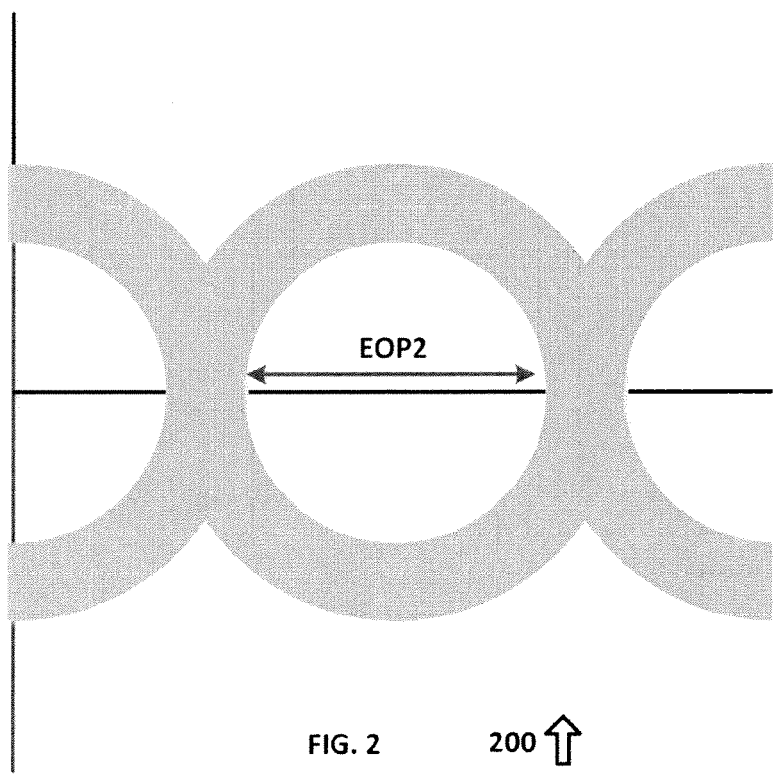
FIG. 2    200 ⇧

ADAPTIVE EQUALIZER UTILIZING EYE DIAGRAM

RELATED APPLICATIONS

The present application claims benefit of U.S. Provisional Patent application 61/603,157, entitled "Adaptive Equalizer based on Monitoring Eye Opening," filed Feb. 24, 2012, which is hereby incorporated by reference for all purposes.

TECHNICAL FIELD

The present disclosure relates to data communications, and more specifically to determining an inverse transfer function to compensate for the transfer function of a communications medium.

BACKGROUND OF THE INVENTION

Data communications over a communications medium such as a cable results in attenuation of the signal, and can introduce noise that can mask the transmitted data.

SUMMARY OF THE INVENTION

A communications system comprising a communications media, such as a cable, is provided. A receiver coupled to the cable is configured to receive a data signal from the cable, and an adaptive equalizer processes the data signal to adjust a multi-frequency inverse transfer function, which is used to compensate for a multi-frequency transfer function of the communications media, such as to provide a substantially flat transfer function.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is an eye diagram for a clean data signal in accordance with an exemplary embodiment of the present disclosure;

FIG. 2 is an eye diagram for a noisy data signal in accordance with an exemplary embodiment of the present disclosure;

DETAILED DESCRIPTION OF THE INVENTION

Figure 3:
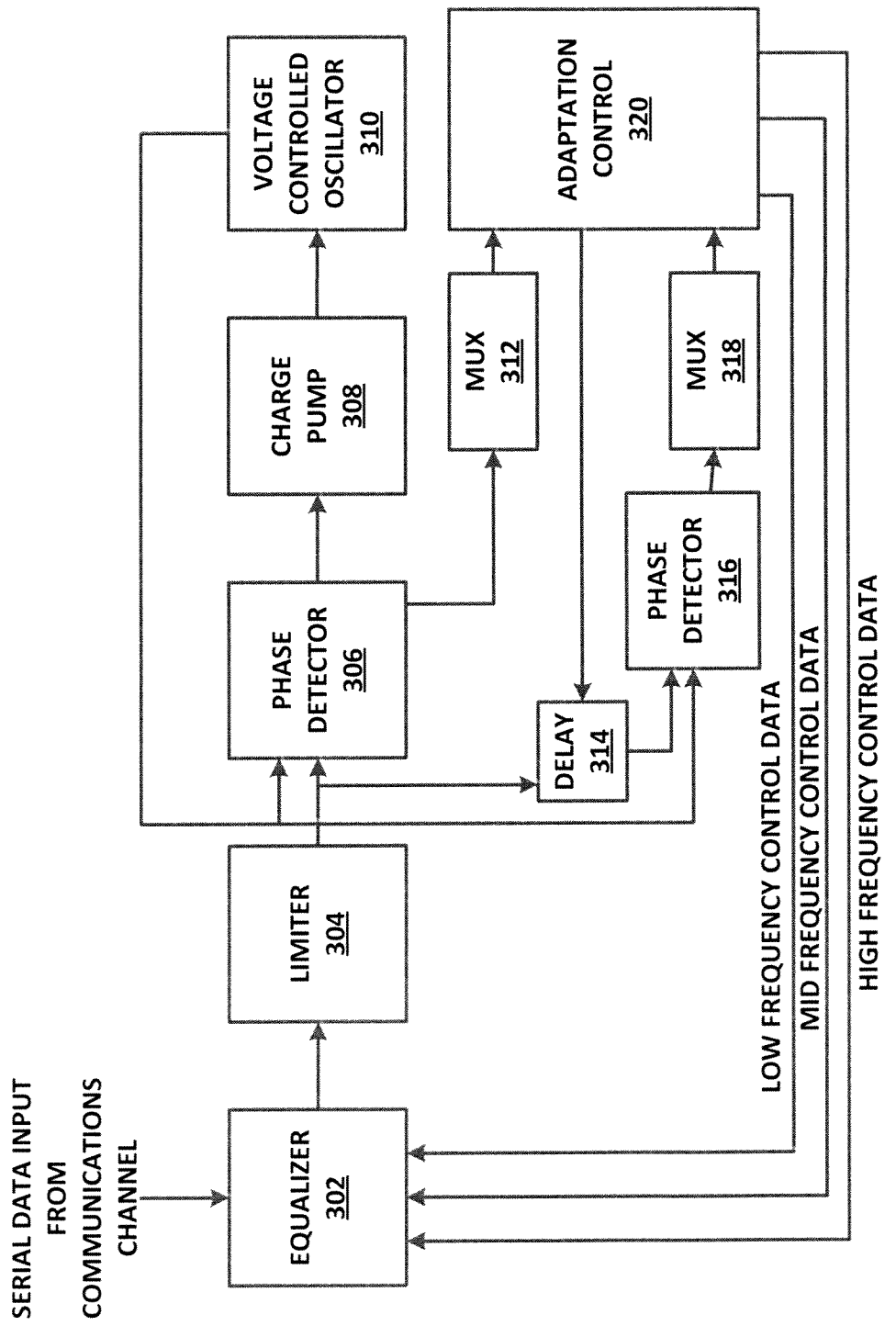
FIG. 3 is a diagram of a system for adaptive equalization of a communications medium in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The following description contains specific information pertaining to implementations of the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

A system, such as a video over coaxial cable system, a high definition multimedia interface (HDMI), a cable television receiver or other suitable systems, may include a driver, such as a cable driver, a channel, such as a coaxial cable, and a receiver. Data transmitted by the driver passes through the transfer function of the channel, which usually has a low pass response. However, the data may suffer from substantial degradation and high jitter, such as due to attenuation of high frequencies, interference or from other causes. For example, in long coaxial cables, which suffer from high attenuation, the channel attenuation at the data rate can be over 60 dB.

To recover the transmitted signal, the effects of the channel can be sufficiently reversed. Equalizers, or analog filters, are circuits that can be used to compensate for this channel loss. To achieve high performance and low jitter, the transfer function of the equalizer should be the inverse of the channel's transfer function.

The transfer function of a cable or other suitable communications media generally has a predetermined value at low frequencies, and then decreases as the frequency increases towards the Nyquist data rate. If the equalizer is exactly inverse to the communications media transfer function, then the ideal frequency response will be flat over the entire frequency range, and the output jitter will be minimal, dominated by the signal-to-noise ratio (SNR) at the receiver input and by non-linear effects such as impedance discontinuity. However, if the equalizer transfer function is not exactly inverse to that of the communications media, a ripple may occur in the overall transfer function, which can be manifested in the received signal as timing jitter.

In typical equalizer applications, non-optimal equalizing of lower frequencies may result in substantial ripple in the combined response, but the data may still be sufficiently recovered at the receiver. For example, a typical equalizer application can encounter around 20 dB of attenuation. If the lower frequencies are not equalized, the ripple in the combined response may be around 3 dB, but the data may still be sufficiently recovered.

In some systems, such as in a video over coaxial cable systems, which may include data rates of 3 Gb/s and long coaxial cables, attenuation may be around 60 dB. Even if a data rate frequency is perfectly equalized, the bit error rate will be very high. For example, at a Nyquist frequency of 60 dB, and a half-Nyquist frequency of about 35 dB, the lapse of about 5 dB can mean the range is not equalized well, resulting in a ripple effect. The corresponding eye pattern will be closed, and at least significant portions of the data may be unrecoverable.

Conventionally, only data rate frequencies are equalized. However, when a sequence of bits does not change, the effect is to create a lower frequency signal component that might be disrupted due to distortion that occurs at the lower frequencies. This observation suggests that substantially the entire frequency range, not just the data rate frequencies, should be equalized.

FIG. 1 is an eye diagram 100 for a clean data signal in accordance with an exemplary embodiment of the present disclosure. Eye diagram 100 has an associated eye diagram opening metric EOP1 that is a function of a flat or ideal effective transfer function. In the absence of any noise or distortion, the eye diagram for the associated data signal has a clean outline, which results in a maximum eye diagram opening metric.

FIG. 2 is an eye diagram 200 for a noisy data signal in accordance with an exemplary embodiment of the present disclosure. Eye diagram 200 has an associated eye diagram opening metric EOP2 that is a function of a non-ideal effective transfer function that has ripples. Because of the associated noise or distortion, the eye diagram for the associated data signal has a fuzzy outline, which results in a reduced eye diagram opening metric. By comparing the eye diagram opening metric before equalization with the eye diagram opening metric after equalization for a data signal, it is possible to determine whether an optimal equalization setting has been selected that adequately compensates for lower frequency components of the transfer function and that avoids the generation of noise or distortion in the transmitted data signal. Common search algorithms can be used to adjust equalizer settings, to optimize the equalizer settings based on an unknown transfer function for a random communications channel, as discussed further herein.

FIG. 3 is a diagram of a system 300 for adaptive equalization of a communications medium in accordance with an exemplary embodiment of the present disclosure. System 300 includes equalizer 302, which can be implemented in hardware or a suitable combination of hardware and software, and which can be one or more software systems operating on a processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as keyboards or mouses, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Equalizer 302 can receive high speed data over a serial digital interface (SDI) input or other suitable serial data interfaces. Equalizer 302 can further receive low frequency control data to control the equalization gain at a low frequency band, mid frequency control data to control the equalization gain at a middle frequency band and high frequency control data to control the equalization gain at a high frequency band. In one exemplary embodiment, the low frequency band can be adapted for gain control at frequencies corresponding to one third of the data rate, the mid frequency band can be adapted for gain control at frequencies corresponding to one half of the data rate and the high frequency band can be adapted for gain control at frequencies corresponding to the data rate. Likewise, other suitable frequencies, frequency bands and equalization settings can also or alternatively be selected.

Limiter 304 receives an output signal from equalizer 302 and clips the output signal to generate a rail-to-rail or binary signal. This rail-to-rail/binary signal is output to phase detector 306, which forms a phase locked loop with charge pump 308 and voltage controlled oscillator 310, which can also act as a clock data recovery (CDR) loop. Charge pump 308 converts a phase error to a voltage, which causes voltage controlled oscillator 310 to generate a higher or lower frequency oscillation, and also performs additional filtering of the voltage output. Voltage controlled oscillator 310 generates a clock signal that is approximately equal to the data rate with a zero voltage input from charge pump 308. The output from voltage controlled oscillator 310 is then fed back to phase detector 306 and phase detector 316.

The phase locked loop will eventually lock onto the data signal that is transmitted over the serial data input, which will cause phase detector 306 to output a serial data signal to deserializer 312, which converts the serial data signal to a parallel data signal. Likewise, phase detector 316 also receives the output from voltage controlled oscillator 310 and a time delayed version of output from limiter 304 through delay 314. Phase detector 306 and phase detector 316 sample the serial data and generate recovered data streams that are relatively free of jitter because the data is sampled from a clean clock signal of voltage controlled oscillator 310.

The serial data streams output by phase detector 306 and phase detector 316 are converted by deserializers 312 and 318, respectively, from serial into parallel data streams. In one exemplary embodiment, the serial data streams can be generated at 3 Gb/s, and the parallel data output of deserializers 312 and 318 can be 8 bits of parallel data at 375 Mb/s. Adaptation control 320 receives the parallel data streams and determines which frequency range needs equalization to increase the area within the eye diagram, based on the differences between the outputs from deserializers 312 and 318. Because the output of deserializer 318 is generated from a delayed signal using time delay $\Delta t$, the sampling of the signal is not optimal, and errors are expected. Further details on the operation of adaptation control 320 are provided below, but in general, adaptation control 320 implements a predetermined search routine that locates the optimal settings for equalizer 302 using a search algorithm. Adaptation control 320 can be implemented using one or more algorithms operating on a digital signal processor, using an application-specific integrated circuit, a plurality of discrete devices, a field programmable gate array or in other suitable manners.

Figure 4:
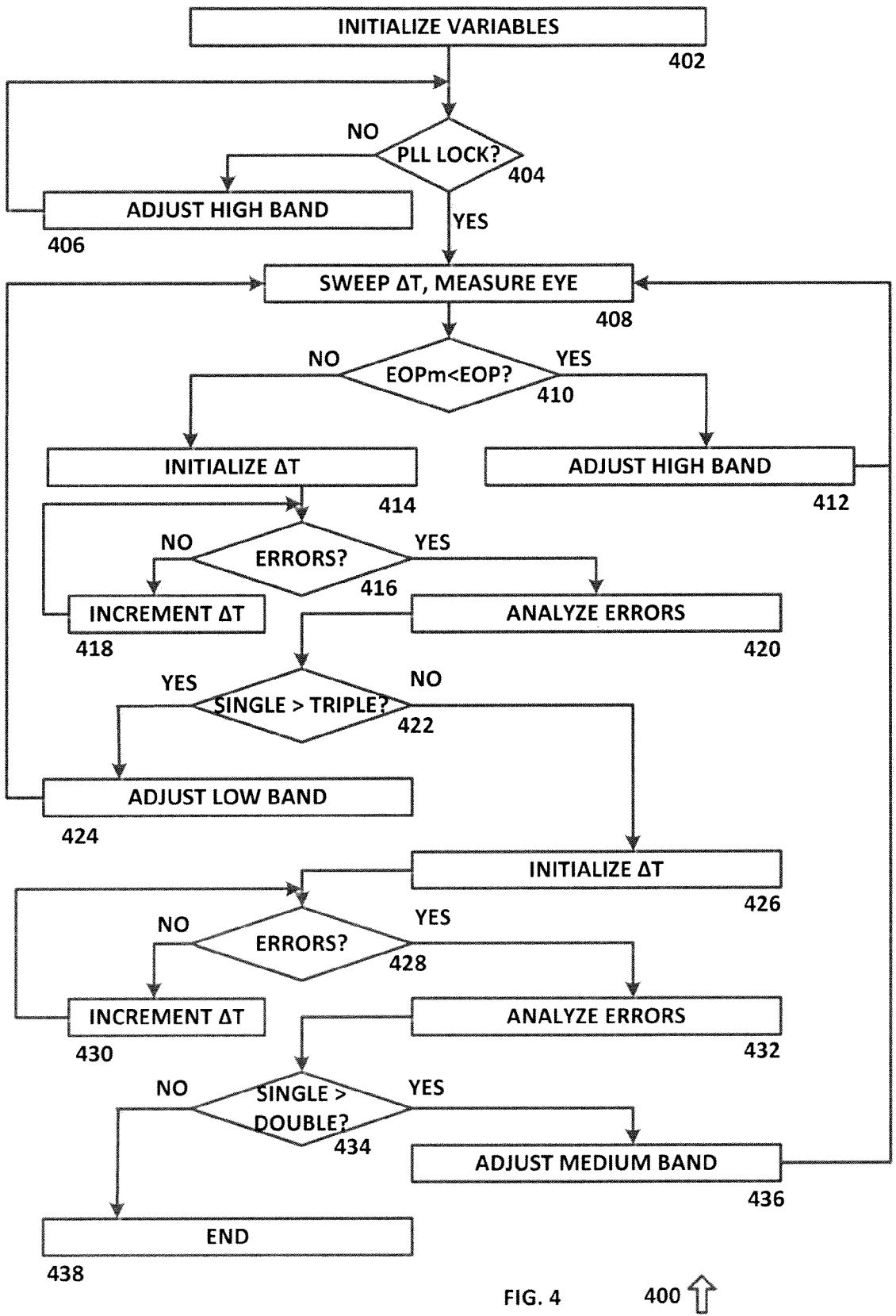
FIG. 4 is a diagram of an algorithm for adaptive equalization of an inverse transfer function for a communications channel in accordance with an exemplary embodiment of the present disclosure.

FIG. 4 is a diagram of an algorithm 400 for adaptive equalization of an inverse transfer function for a communications channel in accordance with an exemplary embodiment of the present disclosure. Algorithm 400 can be implemented in hardware or a suitable combination of hardware and software, and can be one or more algorithms operating on a digital signal processor or other suitable processors.

Algorithm 400 begins at 402, where variables are initialized. In one exemplary embodiment, the equalization gain level for the high frequency band can be set to a maximum equalization, the equalization gain level for the low frequency band can be set to a minimum equalization, Δt, the counter for time delay or phase shift, can be set to zero, and the eye opening metric can be set to a maximum value (EOP). The algorithm then proceeds to 404.

At 404, it is determined, whether the phase locked loop has locked onto a data frequency. If the phase locked loop has not locked, the algorithm proceeds to 406 where the high band equalization gain setting is incrementally reduced to the next lowest setting. In one exemplary embodiment, the high band corresponds to the highest frequency associated with the serial data signal, which would be associated with a sequence of digital data such as 0 1 0 1 0 1 0 and so forth, such that locking onto the highest frequency component of the serial data stream will generally be easier than locking onto lower frequency components. If it is determined at 404 that PLL lock has been achieved, the algorithm proceeds to 406.

At 406, the width of the eye diagram metric is determined. In one exemplary embodiment, a temporary variable (EOPm) can be used to store the maximum value of Δt to compare with EOP, the eye opening metric measured previously. If it is determined at 410 that EOPm is less than EOP, then the algorithm proceeds to 412 where the high band equalizer gain can be decreased to the next lower increment and EOP can be set equal to EOPm. The algorithm then returns to 408. During this loop, algorithm 400 steps down the gain setting for the high frequency band equalization gain until the eye diagram metric stops changing with an incremental decrease in the high frequency band equalization gain.

If it is determined at 410 that the eye diagram metric has not changed (e.g. EOPm is not less than EOP), then algorithm 400 proceeds to 414 where Δt is initialized, and then the algorithm proceeds to 416 where it is determined whether an error exists between the output of the sampled serial signal and a delayed serial signal (for a delay equal to Δt). If no errors are detected, the algorithm proceeds to 418 where Δt is incremented, and the algorithm returns to 416. If errors are detected, it can be determined that the current value of Δt corresponds to the horizontal width of the eye opening, and the algorithm proceeds to 420, where the errors are analyzed. In one exemplary embodiment, statistical analysis can be performed as a function of transmitted bit patterns. The statistical analysis can take into account whether the incoming signal has a certain energy distribution. For example, the bit pattern 1010 (or 0101) can correspond to single bit errors, whereas 111000 (or 000111) can correspond to triple bit errors, and the number of single bit errors can be compared to the number of double bit errors. Because the 1010 bit pattern can correspond to the high frequency (or Nyquist frequency) band and the 111000 bit pattern can correspond to the low frequency (or one-third-Nyquist frequency) band, the disparity between the number of single bit and triple bit errors can be used to determine whether to increase low frequency band equalization gain. If it is determined that there are more single than triple bit errors, the algorithm proceeds to 424 where the low frequency band equalization gain is incrementally increased, and the algorithm returns to 408, where the high frequency band is readjusted. Likewise, if it is determined than the number of single bit errors is not greater that the number of double bit errors, the algorithm proceeds to 426.

At 426, Δt is re-initialized, and the algorithm proceeds to 428, where it is determined whether an error exists between the output of the sampled serial signal and a delayed serial signal (for a delay equal to Δt). If no errors are detected, the algorithm proceeds to 430 where Δt is incremented, and the algorithm returns to 428. Otherwise, the algorithm proceeds to 432 where errors are analyzed. In one exemplary embodiment, the errors can be analyzed to detect double bit errors (1100 versus 1010). Likewise, other suitable error checking can be performed. If it is determined that the number of single bit errors is greater than the number of double bit errors at 434, the algorithm proceeds to 436, where the middle band equalizer gain is adjusted. In one exemplary embodiment, the middle band equalizer gain can be incrementally increased or decreased, such as from a minimum or maximum value for the middle band, respectively. Likewise, other suitable search algorithms can be used to adjust the middle band or any other suitable bands, and such search algorithms are specifically contemplated as being encompassed by the present disclosure. The algorithm then returns to 408. If it is determined at 434 that the single bit error is not greater than the double bit error, the algorithm proceeds to 438 and ends, and the equalizer inverse transfer function settings are used to process steady state data.

In operation, algorithm 400 is used to determine equalizer inverse transfer function settings to compensate for the transfer function of a communications medium, in order to obtain a flat frequency response and to avoid the generation of data errors during transmission of data. Algorithm 400 can be used with a serial data stream or other suitable data streams.

Unlike methods that only equalize at the Nyquist frequency, the present disclosure can adaptively monitor an eye diagram opening metric that is associated with data transmitted over a communications medium in order to adjust more than one frequency band. Although three frequency bands are discussed herein, any suitable number of frequency bands or even discrete frequencies can be monitored and equalized. Furthermore, the present disclosure should not be considered limiting. For example, while certain exemplary embodiments disclosed herein reach an end of calibration, in some implementations, calibration can continue or can be run periodically. Furthermore, while certain exemplary embodiments contemplate one-directional equalization, equalization can be performed in more than one direction, using a random search criteria, using empirically-derived data or in other suitable configurations.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A communications system comprising:
   a communications media;

a receiver coupled to the communications media and configured to receive a data signal from the communications media; and an adaptive equalizer configured to process the data signal and to adjust a multi-frequency inverse transfer function to compensate for a multi-frequency transfer function of the communications media, wherein the adaptive equalizer comprises:

a first phase detector configured to receive the data signal and to generate a first data stream;

a controllable delay configured to receive the data signal and to generate a delayed data signal; and a second phase detector configured to receive the delayed data signal and to generate a second data stream.

2. The system of claim 1 wherein the adaptive equalizer further comprises a multi-band equalizer having a plurality of frequency bands, wherein each frequency band is selected as a function of a Nyquist frequency of the data signal.

3. The system of claim 1 wherein the adaptive equalizer further comprises a limiter configured to receive and clip the data signal prior to input to the first phase detector and the controllable delay.

4. The system of claim 1 wherein the adaptive equalizer further comprises a phase locked loop.

5. The system of claim 1 further comprising a controller configured to receive the first data stream and the second data stream and to generate a control signal for the controllable delay.

6. The system of claim 1, wherein the adaptive equalizer further comprises a phase locked loop including the first phase detector, a charge pump and a voltage controller oscillator.

7. A communications system comprising:
a communications media;
a receiver coupled to the communications media and configured to receive a data signal from the communications media, the receiver further comprising:
a multi-band equalizer having a plurality of frequency bands, wherein each frequency band is selected as a function of a Nyquist frequency of the data signal and configured to process the data signal to generate a processed signal;
a limiter coupled to the multi-band equalizer and configured to receive the processed signal and to generate a digital signal;
a first phase detector coupled to the limiter and configured to receive the digital signal and an oscillator signal and to generate a phase error signal and a first data signal;
a charge pump coupled to the first phase detector and configured to receive the phase error signal and to generate a voltage as a function of the phase error signal;
a voltage controlled oscillator coupled to the charge pump and configured to receive the voltage and to generate the oscillator signal;
a controllable delay coupled to the limiter and operable to receive a delay control signal and to controllably delay the digital signal;
a second phase detector coupled to the controllable delay and the voltage controlled oscillator and configured to receive the delayed digital signal and the oscillator signal and to generate a second data signal; and
a controller coupled to the first phase detector and the second phase detector and configured to receive the first data signal and the second data signal and to generate the delay control signal.

8. A method comprising:
receiving a data signal from a communications medium;
determining a first equalizer configuration for a first frequency band of an inverse transfer function for the communications medium, wherein the determining includes measuring a first eye diagram metric for the first equalizer configuration, and wherein the measuring comprises processing the data signal using the first equalizer configuration, generating an eye diagram using the processed data signal, and incrementally sweeping the eye diagram to generate the first eye diagram metric; and
determining a second equalizer configuration for a second frequency band of the inverse transfer function for the communications medium.

9. The method of claim 8 further comprising measuring a second eye diagram metric for the second equalizer configuration.

10. The method of claim 9 further comprising determining whether the first eye diagram metric is greater than the second eye diagram metric.

11. The method of claim 10 further comprising storing the second eye diagram metric as the first eye diagram metric based on the determining whether the first eye diagram metric is greater than the second eye diagram metric;
determining a third equalizer configuration for a third frequency band of the inverse transfer function for the communications medium; and
measuring a third eye diagram metric for the third equalizer configuration and determining whether the first eye diagram metric is greater than the third eye diagram metric.

12. The method of claim 9 wherein the measuring the second eye diagram metric further comprises:
processing the data signal using the second equalizer configuration;
generating the eye diagram using the processed data signal; and
incrementally sweeping the eye diagram to generate the second eye diagram metric.

13. The method of claim 12 further comprising:
using the first equalizer configuration if the first eye diagram metric is equal to the second eye diagram metric; and
replacing the first equalizer configuration with the second equalizer configuration based on if the first eye diagram metric is equal to the second eye diagram metric.

14. A method for use by a communications system including an adaptive equalizer and a receiver, the method comprising:
receiving a data signal by the receiver from a communications media;
processing the data signal, using an adaptive equalizer including circuitry, by adjusting a multi-frequency inverse transfer function to compensate for a multi-frequency transfer function of the communications media, the processing comprising;
receiving, using a first phase detector, the data signal and generating a first data stream;
receiving, using a controllable delay, the data signal and generating a delayed data signal; and
receiving, using a second phase detector, the delayed data signal and generating a second data stream.

15. The method of claim 14, wherein the adaptive equalizer further comprises a multi-band equalizer having a plurality of frequency bands, and wherein the method further comprises selecting, using the multi-band equalizer, each frequency band as a function of a Nyquist frequency of the data signal.

16. The method in claim 14, wherein the adaptive equalizer further comprises a limiter, and wherein the method further comprises receiving, using the limiter, the data signal and clipping the data signal prior to receiving, using the first phase detector and receiving, using the controllable delay.

17. The method of claim 14, wherein the adaptive equalizer further comprises a phase locked loop including the first phase detector, a charge pump and voltage controlled oscillator.

18. The method of 14, wherein the system includes a controller, and wherein the method further comprises:
- receiving, using the controller, the first data stream and the second data stream; and
- generate, using the controller, a control signal for the controllable delay.

* * * * *